(12) United States Patent
Ramamurthy et al.

(10) Patent No.: US 8,879,508 B2
(45) Date of Patent: Nov. 4, 2014

(54) METHOD AND APPARATUS FOR THROTTLING PERSISTENT ALWAYS ON APPLICATIONS

(75) Inventors: Venugopal Ramamurthy, San Diego, CA (US); Shaohong Qu, San Diego, CA (US); Sriram Nagesh Nookala, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 838 days.

(21) Appl. No.: 12/183,849

(22) Filed: Jul. 31, 2008

(65) Prior Publication Data

US 2010/0027504 A1 Feb. 4, 2010

(51) Int. Cl.
*H04W 4/00* (2009.01)
*H04W 36/14* (2009.01)
*H04W 36/30* (2009.01)
*H04W 88/06* (2009.01)

(52) U.S. Cl.
CPC .............. *H04W 36/14* (2013.01); *H04W 36/30* (2013.01); *H04W 88/06* (2013.01)
USPC .......................................... 370/332; 455/437

(58) Field of Classification Search
None
See application file for complete search history.

(56) References Cited

U.S. PATENT DOCUMENTS

| | | | |
|---|---|---|---|
| 6,272,148 B1 * | 8/2001 | Takagi et al. | 370/469 |
| 6,785,549 B2 | 8/2004 | Spartz et al. | |
| 2003/0031143 A1 * | 2/2003 | Faerber | 370/331 |
| 2005/0143072 A1 * | 6/2005 | Yoon et al. | 455/436 |
| 2005/0233715 A1 * | 10/2005 | Laroia et al. | 455/133 |
| 2005/0233746 A1 * | 10/2005 | Laroia et al. | 455/436 |
| 2005/0272428 A1 * | 12/2005 | Tanabe et al. | 455/439 |
| 2006/0092880 A1 * | 5/2006 | Nounin et al. | 370/331 |
| 2006/0176855 A1 * | 8/2006 | Oh et al. | 370/331 |
| 2008/0320108 A1 * | 12/2008 | Murty et al. | 709/220 |
| 2009/0046665 A1 * | 2/2009 | Robson et al. | 370/332 |
| 2009/0285175 A1 * | 11/2009 | Nix | 370/331 |
| 2013/0272260 A1 * | 10/2013 | Bitran et al. | 370/329 |

FOREIGN PATENT DOCUMENTS

| | | |
|---|---|---|
| EP | 1292074 A2 | 3/2003 |
| EP | 1677490 A1 | 7/2006 |
| EP | 1850534 A1 | 10/2007 |
| JP | 2001224050 A | 8/2001 |
| JP | 2008503170 A | 1/2008 |
| KR | 2007068789 A | 7/2007 |
| WO | 2006118732 A2 | 11/2006 |

OTHER PUBLICATIONS

Bryhmi, H., "Staying Mobile", Wireless: Article, SYS-CON Media, Inc., Jan. 1, 2000; 1-7.*
Haakon Bryhni: "Staying Mobile" [Online] Feb. 1, 2000, Wireless, SYS-CON Media, Inc., XP002553108, Retrieved from the Internet:URL:http://wireless.sys-con.com/node/41198.

(Continued)

*Primary Examiner* — Mohammad Adhami
(74) *Attorney, Agent, or Firm* — Darren M. Simon (57) ABSTRACT

An apparatus and method for facilitating inter-technology handoff from a home wireless network comprising comparing a parameter of a home signal to a threshold, wherein the home signal is from the home wireless network where the data session of a persistent always ON application is established; throttling the persistent always ON application; and attempting to acquire a first alternative signal acceptable to the persistent always ON application from a first alternative wireless network using a single RF chain.

30 Claims, 5 Drawing Sheets

(56) References Cited

OTHER PUBLICATIONS

International Search Report and Written Opinion—PCT/US2009/052305—ISA/EPO—Nov. 10, 2009.
Mukhegee S et al., "Always on: a new paradigm for wireless networks", Personal, Indoor and Mobile Radio, Communications, 2004. PIMRC 2004. 15 th, IEEE International Symposium on Barcelona, Spain Sep. 5-8, 2004, Piscataway, NJ, USA,IEEE, Piscataway, NJ, USA, vol. 1, Sep. 5, 2004, pp. 226-233, XP010754593, ISBN: 978-0-7803-8523-8.
Taiwan Search Report—TW098125919—TIPO—Jan. 11, 2013.

* cited by examiner

METHOD AND APPARATUS FOR THROTTLING PERSISTENT ALWAYS ON APPLICATIONS

FIELD

This disclosure relates generally to apparatus and methods for persistent always on applications. More particularly, the disclosure relates to throttling persistent always on applications to facilitate inter-technology handoff.

BACKGROUND

Wireless persistent always ON applications are typically required when a mobile device or user equipment (UE) must be reachable from some host at all time. Wireless applications may require rapid response from a UE, so the UE is persistently registered and authenticated on the home wireless network. For example, mobile-terminated connections may be initiated at random times.

In a persistent always ON application, the home wireless network attempts to re-establish a wireless link immediately between the UE and an access node whenever that link is interrupted. Many factors can interrupt the link between the UE and the access node, such as a signal fade due to propagation condition or a weak signal level due to marginal conditions, etc. Although the link is interrupted, an alternative wireless network using an alternative wireless access technology may be available. Typically, however, the UE is unable to connect to the alternative wireless network because the UE with its persistent always ON application will continue to attempt to reconnect its link with its home wireless network. The UE is thus unable to utilize the availability of the alternative wireless network.

SUMMARY

Disclosed is an apparatus and method for throttling persistent always ON applications to facilitate inter-technology handoff using a single RF chain. According to one aspect, a method for facilitating inter-technology handoff from a home wireless network comprising comparing a parameter of a home signal to a threshold, wherein the home signal is from the home wireless network where the data session of a persistent always ON application is established; throttling the persistent always ON application; and attempting to acquire a first alternative signal acceptable to the persistent always ON application from a first alternative wireless network using a single RF chain.

According to another aspect, a method for facilitating inter-technology handoff from a home wireless network comprising monitoring a home signal, wherein the home signal is from the home wireless network where the data session of a persistent always ON application is established; comparing a parameter of the home signal to a threshold; throttling the persistent always ON application; referring to a list showing a plurality of access technologies; and acquiring an alternative signal acceptable to the persistent always ON application, wherein the alternative signal is from an alternative wireless network employing one of the plurality of access technologies.

According to another aspect, a user equipment comprising a processor and a memory, the memory containing program code executable by the processor for performing the following: comparing a parameter of a home signal to a threshold, wherein the home signal is from a home wireless network where the data session of a persistent always ON application is established; throttling the persistent always ON application; and attempting to acquire a first alternative signal acceptable to the persistent always ON application from a first alternative wireless network using a single RF chain.

According to another aspect, a user equipment comprising a processor and a memory, the memory containing program code executable by the processor for performing the following: monitoring a home signal, wherein the home signal is from a home wireless network where the data session of a persistent always ON application is established; comparing a parameter of the home signal to a threshold; throttling the persistent always ON application; referring to a list showing a plurality of access technologies; and acquiring an alternative signal acceptable to the persistent always ON application, wherein the alternative signal is from an alternative wireless network employing one of the plurality of access technologies.

According to another aspect, a communication device for facilitating inter-technology handoff from a home wireless network comprising means for comparing a parameter of a home signal to a threshold, wherein the home signal is from the home wireless network where the data session of a persistent always ON application is established; means for throttling the persistent always ON application; and means for attempting to acquire a first alternative signal acceptable to the persistent always ON application from a first alternative wireless network using a single RF chain.

According to another aspect, a communication device for facilitating inter-technology handoff from a home wireless network comprising means for monitoring a home signal, wherein the home signal is from the home wireless network where the data session of a persistent always ON application is established; means for comparing a parameter of the home signal to a threshold; means for throttling the persistent always ON application; means for referring to a list showing a plurality of access technologies; and means for acquiring an alternative signal acceptable to the persistent always ON application, wherein the alternative signal is from an alternative wireless network employing one of the plurality of access technologies.

According to another aspect, a computer-readable medium including program code stored thereon, comprising program code for comparing a parameter of a home signal to a threshold, wherein the home signal is from a home wireless network where the data session of a persistent always ON application is established; program code for throttling the persistent always ON application; and program code for attempting to acquire a first alternative signal acceptable to the persistent always ON application from a first alternative wireless network using a single RF chain.

According to another aspect, a computer-readable medium including program code stored thereon, comprising program code for monitoring a home signal, wherein the home signal is from a home wireless network where the data session of a persistent always ON application is established; program code for comparing a parameter of the home signal to a threshold; program code for throttling the persistent always ON application; program code for referring to a list showing a plurality of access technologies; and program code for acquiring an alternative signal acceptable to the persistent always ON application, wherein the alternative signal is from an alternative wireless network Advantages of the present disclosure include allowing inter-technology handoff using a single RF chain, ability to acquire other available networks with a stronger signal and improve wireless coverage for a persistent always ON application.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Figure 1:
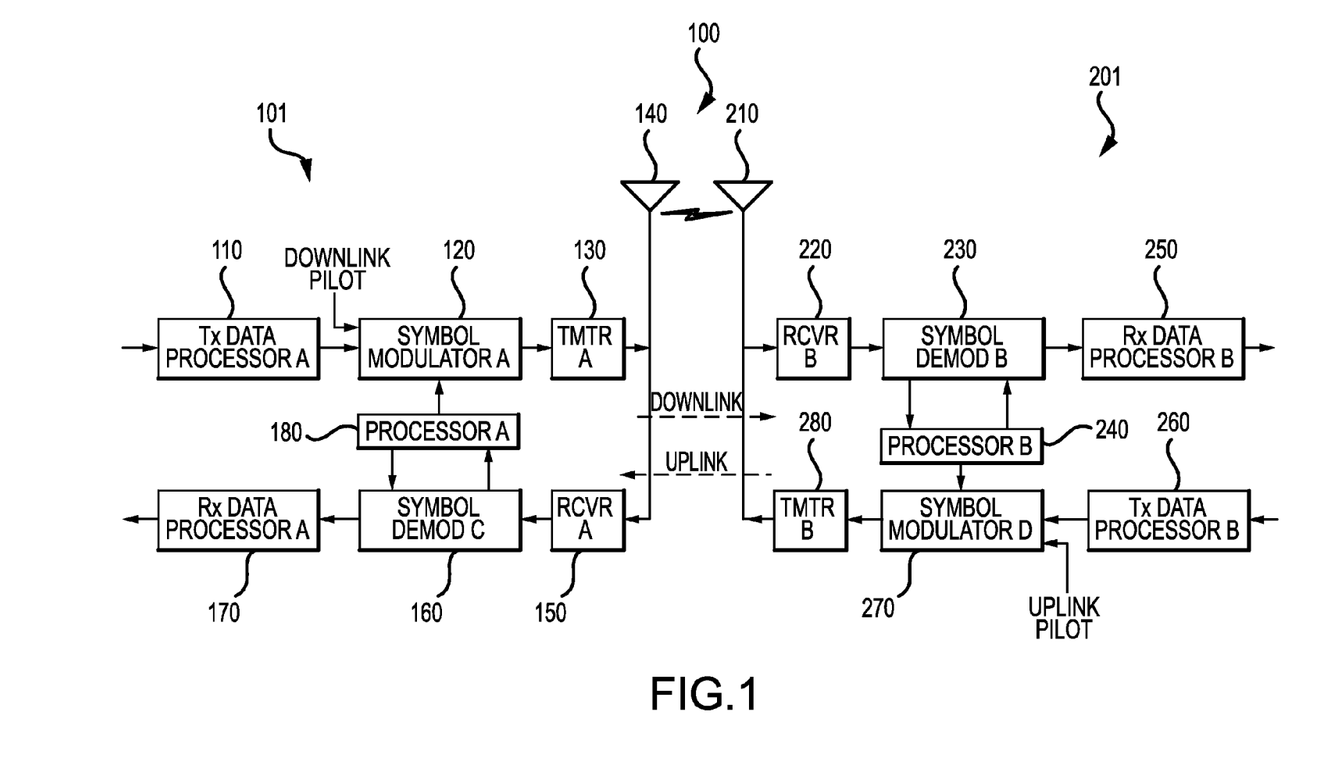
FIG. 1 is a block diagram illustrating an example access node/user equipment (UE) system.

FIG. 1 is a block diagram illustrating an example access node/user equipment (UE) system 100. One skilled in the art would understand that the example access node/UE system 100 illustrated in FIG. 1 may be implemented in an FDMA environment, an OFDMA environment, a CDMA environment, a WCDMA environment, a TDMA environment, a SDMA environment or any other suitable wireless environment.

The access node/UE system 100 includes an access node $A_1$ 101 (a.k.a. base station) and a user equipment or UE 201 (a.k.a. wireless communication device). In the downlink leg, the access node $A_1$ 101 (a.k.a. base station) includes a transmit (TX) data processor A 110 that accepts, formats, codes, interleaves and modulates (or symbol maps) traffic data and provides modulation symbols (a.k.a. data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (a.k.a. data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node $A_1$ 101 (a.k.a. base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the access node/UE system 100 is a multiple-access system. For a multiple-access system (e.g., FDMA, OFDMA, CDMA, TDMA, SDMA, etc.), multiple terminals transmit concurrently on the uplink leg. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
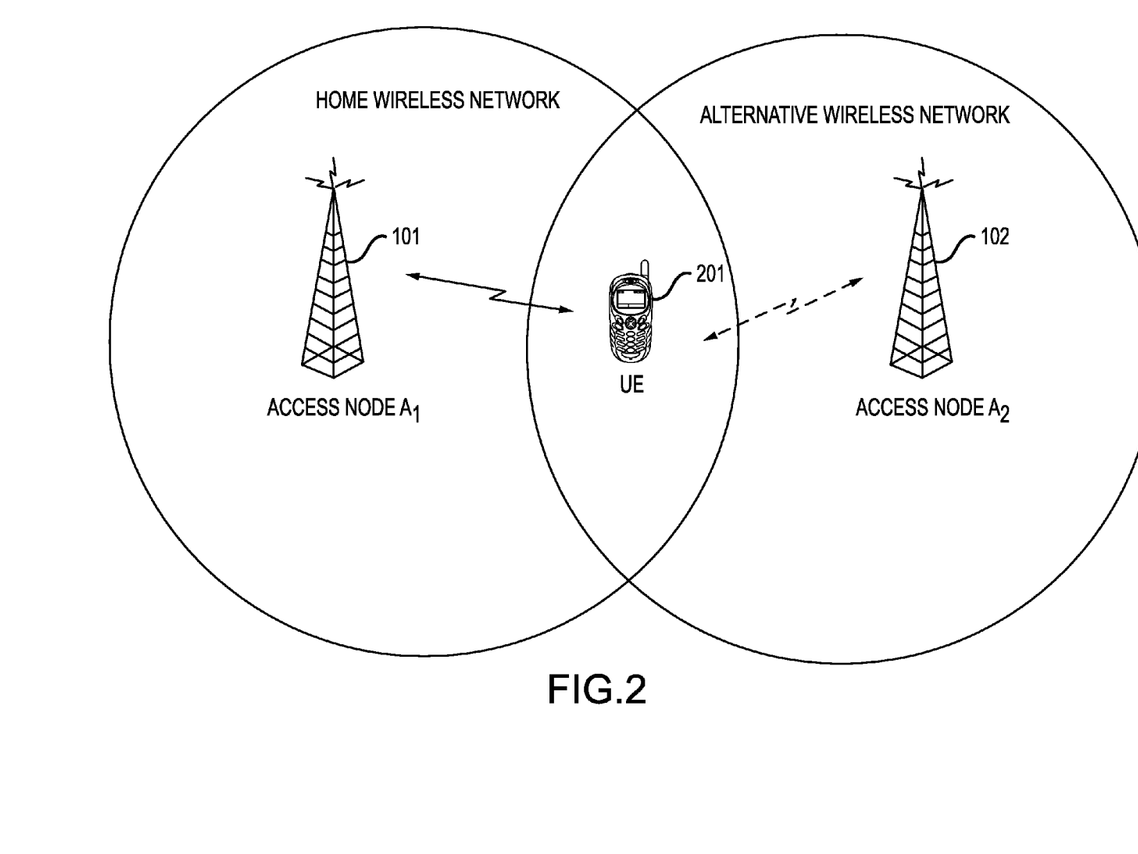
FIG. 2 shows an example of the user equipment (UE) in communication with the access node in a home wireless network.

FIG. 2 shows an example of the user equipment (UE) 201 in communication with the access node $A_1$ 101 in a home wireless network. The UE 201 communicates with a persistent always ON application from the home wireless network. The UE 201 includes a single RF chain to receive and transmit a signal as shown in FIG. 1. The characteristic of the persistent always ON application requires the single RF chain to be continuously used even when the home signal from the home wireless network is weak. Additionally, even when the home signal from the home wireless network has dropped, for example due to a fade, the single RF chain attempts to reacquire the home signal from the home wireless network. The continuous attempt by the single RF chain to use a weak home signal or to reacquire the home signal from the home wireless network prevents the UE 201 from acquiring an alternative signal from an access node $A_2$ 102 within an alternative wireless network even if the alternative signal is stronger than the home signal. However, by throttling the persistent always ON application when the home signal is dropped, the UE 201 using the single RF chain attempts to acquire the alternative signal from the alternative wireless network to replace the home signal. The UE 201 now communicates with the persistent always ON application through the alternative signal from the alternative wireless network.

In one aspect, the symbol demod B 230 within the UE 201 is reconfigurable to demodulate either the home signal or the alternative signal. In another aspect, the UE 201 comprises two symbol demods, one compatible with the home signal and the other compatible with the alternative signal. The access technology of the home wireless network or the alternative wireless network may be UMTS (universal mobile telecommunication system), WCDMA (wideband code division multiple access), GSM (Global System for Mobile communications), GSM/GPRS (General Packet Radio Service/EDGE (Enhanced Data Rates for GSM Evolution), LTE (long term evolution), IS-95 (interim standard 95), CDMA2000, EVDO (evolution data optimized), UMB (ultra mobile broadband) or wireless LANs, etc. One skilled in the art would understand that the list of access technologies is not exclusive and that other access technologies may be used without affecting the spirit or scope of the present disclosure.

Figure 3:
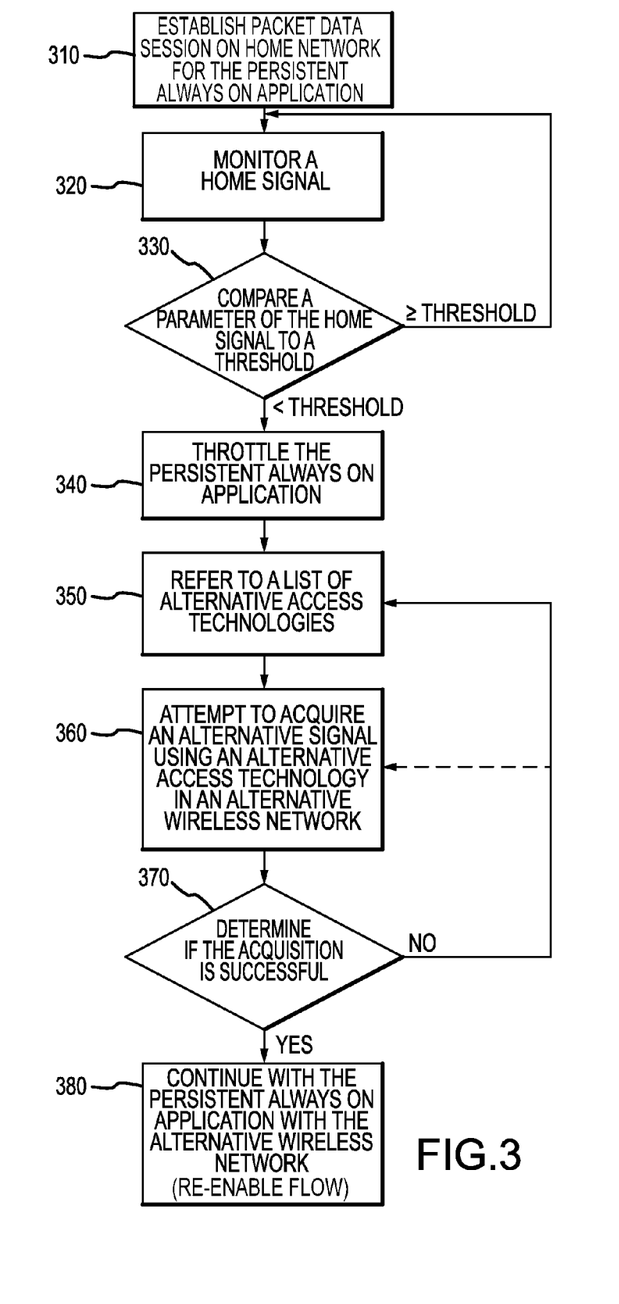
FIG. 3 shows an example flow diagram for throttling persistent always ON applications to facilitate inter-technology handoff using a single RF chain.

FIG. 3 shows an example flow diagram for throttling persistent always ON applications to facilitate inter-technology handoff using a single RF chain. In block 310, establish packet data session on a home wireless network (a.k.a. home network) for the persistent always ON application. The persistent always ON application initiates the packet data session immediately upon acquiring service on the home wireless network. In one aspect, the home signal is from the home wireless network where the data session of the persistent always ON application is established. Following block 310, proceed to block 320. In block 320, monitor the signal level observed on the antenna from the home network (i.e., the home signal). Compare a parameter of the home signal to a threshold in block 330. In one aspect, examples of the threshold and parameters of the home signal are received signal level, received signal-to-noise ratio, received interference power, total received power, path loss, bit error rate, frame error rate or packet loss rate, etc. One skilled in the art would understand that the threshold and home signal parameters can be chosen based on the system, application, operator choice, design constraints or combinations thereof without affecting the scope and spirit of the present disclosure.

In block 330, if the home signal parameter is greater than or equal to the threshold, return to block 320 to continue monitoring the home signal. If the home signal parameter is less than the threshold, proceed to block 340. One skilled in the art would understand that depending on the example of the threshold and home signal parameter (e.g., bit error rate, etc.), the threshold comparison may require an opposite polarity convention. In block 340, throttle the persistent always ON application. Throttling of persistent always ON application happens internally within the UE without any interaction with the home network. In one aspect, the throttling can be done by flow controlling the persistent always ON application and preventing the persistent always ON application from attempting to send any more data until a stronger and stable network connectivity is re-established.

Following block 340, in block 350, refer to a list of alternative access technologies that are compatible with its operations. One skilled in the art would understand that the list may be stored within a memory unit within the UE or external to the UE. In the event the list is stored in a memory unit external to the UE, the UE requests for the list as needed. In block 360, attempt to acquire an alternative signal using one of the alternative access technologies in the list from an alternative wireless network, i.e., attempt an inter-technology handoff. One skilled in the art would understand that many examples of access technologies, including but not limited to, UMTS, WCDMA, GSM, GSM/GPRS/EDGE, LTE, IS-95, CDMA2000, EVDO or UMB, or wireless LANs, etc. are applicable to the example shown in FIG. 3 without affecting the scope and spirit of the present disclosure. In one aspect, the persistent always ON application specifies the choice of an acceptable alternative wireless network.

Following the attempt in block 360, determine if the acquisition to the alternative signal is successful in block 370. If the acquisition is not successful, return to block 350 and then to block 360. Alternatively, if the acquisition is not successful, directly return to block 360 to attempt to acquire yet another alternative signal using another one of the alternative access technologies on the list. In block 370, if the acquisition to the alternative signal is successful, continue with the persistent always ON application (re-enable flow to send application data) with the alternative wireless network in block 380. In one aspect, some or all of the flow diagram steps in FIG. 3 are performed by a user equipment. Alternatively, the UE 201 performs some or all of the flow diagram steps shown in FIG. 3. One skilled in the art would understand that although the flow diagram of FIG. 3 is described in a linear fashion, some of the steps and functionalities described can be interchanged without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that performs the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art.

Figure 4:
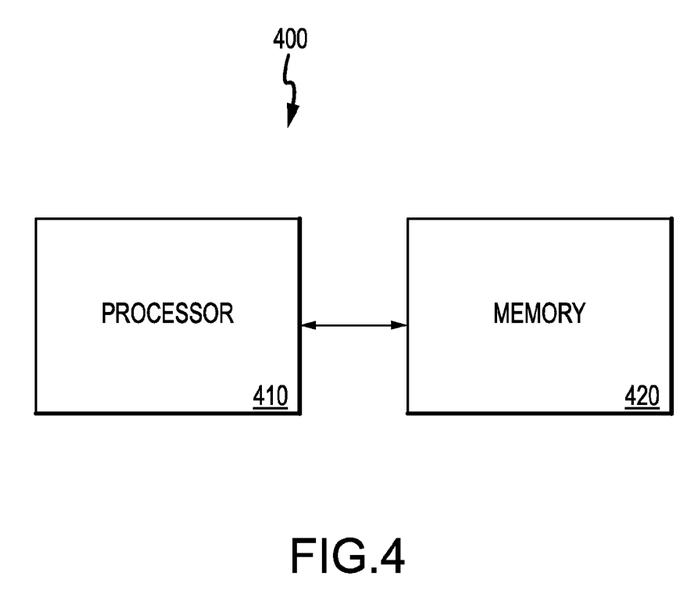
FIG. 4 shows an example of a device comprising a processor in communication with a memory for executing the throttling persistent always ON applications to facilitate inter-technology handoff using a single RF chain.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks, modules and/or steps described herein. FIG. 4 shows an example of a device 400 comprising a processor 410 in communication with a memory 420 for executing the throttling persistent always ON applications to facilitate inter-technology handoff using a single RF chain. In one example, the device 400 is used to implement the algorithm illustrated in FIG. 3. In one aspect, the memory 420 is located within the processor 410. Alternatively, the memory 420 is external to the processor 410.

Figure 5:
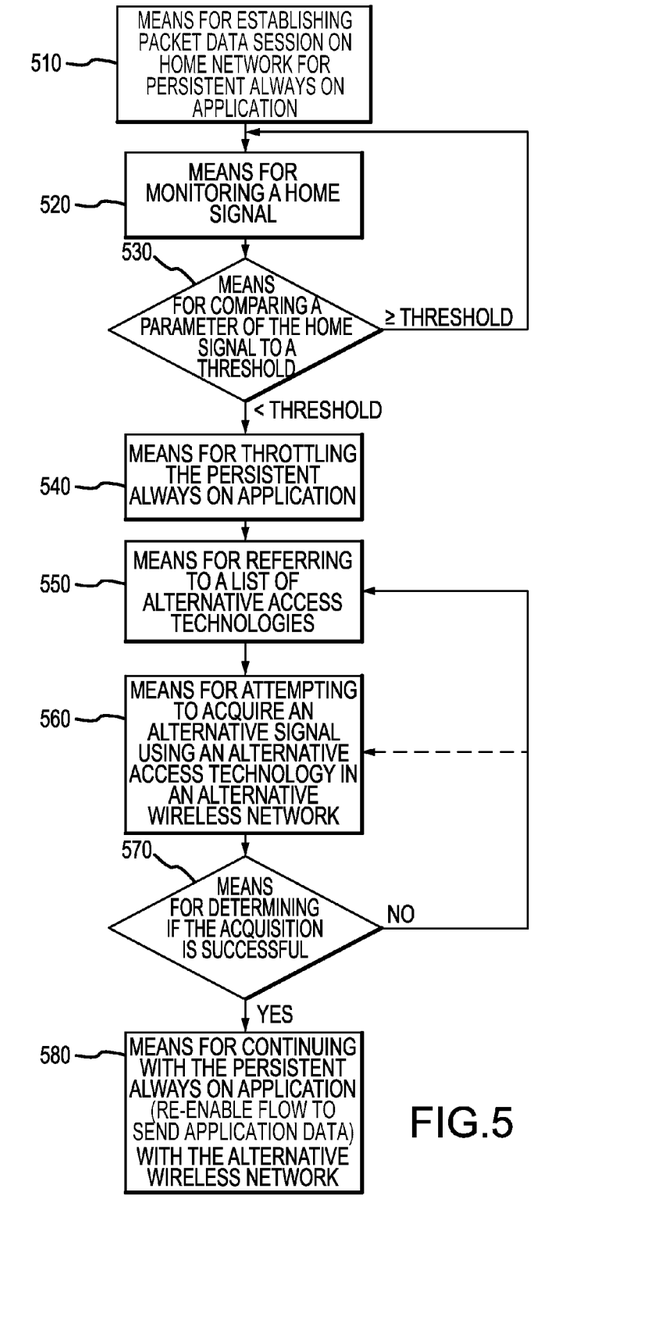
FIG. 5 shows an example of a device suitable for throttling persistent always ON applications to facilitate inter-technology handoff using a single RF chain.

FIG. 5 shows an example of a device 500 suitable for throttling persistent always ON applications to facilitate inter-technology handoff using a single RF chain. In one aspect, the device 500 is implemented by at least one processor comprising one or more modules configured to provide different aspects of throttling persistent always ON applications to facilitate inter-technology handoff using a single RF chain as described herein in blocks 510, 520, 530, 540, 550, 560, 570, and 580. For example, each module comprises hardware, firmware, software, or any combination thereof. In one aspect, the device 500 is also implemented by at least one memory in communication with the at least one processor. In one example, the device 500 is a user equipment. Alternatively, the device 500 is the UE 201 shown in FIG. 1.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for facilitating inter-technology handoff from a home wireless network, comprising:
using a single radio frequency (RF) chain of a user equipment (UE) for:
establishing, between the UE and the home wireless network, a data session associated with a persistent always ON application;
comparing a parameter of a home signal associated with the home wireless network to a threshold;
upon detecting that the home signal is less than the threshold, throttling the persistent always ON application, wherein throttling the persistent always ON application comprises temporarily preventing the UE from attempting to transmit data associated with the always ON application; and
attempting to acquire a first alternative signal acceptable to the persistent always ON application from a first alternative wireless network, wherein the home wireless network and the first alternative wireless network communicate according to different access technologies, and wherein the throttling persists until the first alternative signal acceptable to the persistent always ON application is acquired.

2. The method of claim 1, wherein the threshold is one of a received signal level, a received signal-to-noise ratio, a received interference power, a total received power, a path loss, a bit error rate, a frame error rate or a packet loss rate.

3. The method of claim 1, wherein the first alternative wireless network employs a first access technology that is one of UMTS, WCDMA, GSM, GSM/GPRS/EDGE, LTE, IS-95, CDMA2000, EVDO, UMB, or wireless LANs.

4. The method of claim 3, wherein the home wireless network employs a second access technology different from the first access technology, wherein the second access technology is one of UMTS, WCDMA, GSM, GSM/GPRS/EDGE, LTE, IS-95, CDMA2000, EVDO, UMB, or wireless LANs.

5. The method of claim 1, further comprising monitoring the home signal.

6. The method of claim 1, further comprising:
determining whether the first alternative signal is acquired successfully;
continuing with the persistent always ON application from the first alternative wireless network when the first alternative signal is acquired successfully; and
referring to a list of a plurality of access technologies to determine a second alternative signal to acquire when the first alternative signal is not acquired successfully.

7. A method for facilitating inter-technology handoff from a home wireless network, comprising:
using a single radio frequency (RF) chain of a user equipment (UE) for:
establishing, between the UE and the home wireless network, a data session associated with a persistent always ON application;
monitoring a home signal associated with the home wireless network;
comparing a parameter of the home signal to a threshold;
upon detecting that the home signal is less than the threshold, throttling the persistent always ON application, wherein throttling the persistent always ON application comprises temporarily preventing the UE from attempting to transmit data associated with the always ON application;
referring to a list of a plurality of access technologies; and
acquiring an alternative signal acceptable to the persistent always ON application, wherein the alternative signal is from an alternative wireless network employing one of the plurality of access technologies, wherein the home wireless network and the alternative wireless network communicate according to different access technologies, and wherein the throttling persists until the alternative signal acceptable to the persistent always ON application is acquired.

8. The method of claim 7, further comprising continuing with the persistent always ON application from the alternative wireless network.

9. The method of claim 8, wherein the home wireless network employs a first access technology, the alternative wireless network employs a second access technology different from the first access technology; and wherein the first access technology is one of UMTS, WCDMA, GSM, GSM/GPRS/EDGE, LTE, IS-95, CDMA2000, EVDO, UMB, or wireless LANs, and the second access technology is one of UMTS, WCDMA, GSM, GSM/GPRS/EDGE, LTE, IS-95, CDMA2000, EVDO, UMB, or wireless LANs.

10. A user equipment (UE) comprising a processor and a memory, the memory containing program code executable by the processor for:
using a single radio frequency (RF) chain of the UE for:
establishing, between the UE and a home wireless network, a data session associated with a persistent always ON application;
comparing a parameter of a home signal associated with the home access network to a threshold;
upon detecting that the home signal is less than the threshold, throttling the persistent always ON application, wherein throttling the persistent always ON application comprises temporarily preventing the UE from attempting to transmit data associated with the always ON application; and
attempting to acquire a first alternative signal acceptable to the persistent always ON application from a first alternative wireless network, wherein the home wireless network and the first alternative wireless network communicate according to different access technologies, and wherein the throttling persists until the first alternative signal acceptable to the persistent always ON application is acquired.

11. The user equipment of claim 10, wherein the threshold is one of a received signal level, a received signal-to-noise ratio, a received interference power, a total received power, a path loss, a bit error rate, a frame error rate or a packet loss rate.

12. The user equipment of claim 10, wherein the first alternative wireless network employs a first access technology that is one of UMTS, WCDMA, GSM, GSM/GPRS/EDGE, LTE, IS-95, CDMA2000, EVDO, UMB, or wireless LANs.

13. The user equipment of claim 12, wherein the home wireless network employs a second access technology different from the first access technology, wherein the second access technology is one of UMTS, WCDMA, GSM, GSM/GPRS/EDGE, LTE, IS-95, CDMA2000, EVDO, UMB, or wireless LANs.

14. The user equipment of claim 10, wherein the memory further contains program code executable by the processor for monitoring the home signal.

15. The user equipment of claim 10, wherein the memory further contains program code executable by the processor for:
determining whether the first alternative signal is acquired successfully;
continuing with the persistent always ON application from the first alternative wireless network when the first alternative signal is acquired successfully; and
referring to a list of a plurality of access technologies to determine a second alternative signal to acquire when the first alternative signal is not acquired successfully.

16. A user equipment (UE) comprising a processor and a memory, the memory containing program code executable by the processor for:
using a single radio frequency (RF) chain for:
establishing, between the UE and a home wireless network, a data session associated with a persistent always ON application;
monitoring a home signal associated with the home wireless network;
comparing a parameter of the home signal to a threshold;
upon detecting that the home signal is less than the threshold, throttling the persistent always ON application, wherein throttling the persistent always ON application comprises temporarily preventing the UE from attempting to transmit data associated with the always ON application;
referring to a list of a plurality of access technologies; and
acquiring an alternative signal acceptable to the persistent always ON application, wherein the alternative signal is from an alternative wireless network employing one of the plurality of access technologies, wherein the home wireless network and the alternative wireless network communicate according to different access technologies, and wherein the throttling persists until the alternative signal acceptable to the persistent always ON application is acquired.

17. The user equipment of claim 16, wherein the home wireless network employs a first access technology, the alternative wireless network employs a second access technology different from the first access technology; and wherein each of the first access technology and the second access technology is one of UMTS, WCDMA, GSM, GSM/GPRS/EDGE, LTE, IS-95, CDMA2000, EVDO, UMB, or wireless LANs.

18. A user equipment (UE) for facilitating inter-technology handoff from a home wireless network, comprising:
means for using a single radio frequency (RF) chain of the UE, including:
means for establishing, between the UE and the home wireless network, a data session associated with a persistent always ON application;
means for comparing a parameter of a home signal associated with the home wireless network to a threshold;
means for throttling the persistent always ON application upon detecting that the home signal is less than the threshold, including means for temporarily preventing the UE from attempting to transmit data associated with the always ON application; and
means for attempting to acquire a first alternative signal acceptable to the persistent always ON application from a first alternative wireless network, wherein the home wireless network and the first alternative wireless network communicate according to different access technologies, and wherein the means for throttling is configured to persist the throttling until the first alternative signal acceptable to the persistent always ON application is acquired.

19. The UE of claim 18, wherein the threshold is one of a received signal level, a received signal-to-noise ratio, a received interference power, a total received power, a path loss, a bit error rate, a frame error rate or a packet loss rate.

20. The UE of claim 18, wherein the first alternative wireless network employs a first access technology, the home wireless network employs a second access technology different from the first access technology; and wherein the second access technology is one of UMTS, WCDMA, GSM, GSM/GPRS/EDGE, LTE, IS-95, CDMA2000, EVDO, UMB, or wireless LANs.

21. The UE of claim 18, further comprising:
means for determining whether the first alternative signal is acquired successfully;
means for continuing with the persistent always ON application from the first alternative wireless network when the first alternative signal is acquired successfully; and
means for referring to a list of a plurality of access technologies to determine a second alternative signal to acquire when the first alternative signal is not acquired successfully.

22. A user equipment (UE) for facilitating inter-technology handoff from a home wireless network, comprising:
means for using a single radio frequency (RF) chain including:
means for establishing, between the UE and the home wireless network, a data session associated with a persistent always ON application;
means for monitoring a home signal associated with the home wireless network;
means for comparing a parameter of the home signal to a threshold;
means for throttling the persistent always ON application upon detecting that the home signal is less than the threshold, including means for temporarily preventing the UE from attempting to transmit data associated with the always ON application;
means for referring to a list of a plurality of access technologies; and
means for acquiring an alternative signal acceptable to the persistent always ON application, wherein the alternative signal is from an alternative wireless network employing one of the plurality of access technologies, wherein the home wireless network and the alternative wireless network communicate according to different access technologies, and wherein the means for throttling is configured to persist the throttling until the alternative signal acceptable to the persistent always ON application is acquired.

23. The communication device of claim 22, wherein the home wireless network employs a first access technology, the alternative wireless network employs a second access technology different from the first access technology; and wherein the first access technology is one of UMTS, WCDMA, GSM, GSM/GPRS/EDGE, LTE, IS-95, CDMA2000, EVDO, UMB, or wireless LANs, and the second access technology is one of UMTS, WCDMA, GSM, GSM/GPRS/EDGE, LTE, IS-95, CDMA2000, EVDO, UMB, or wireless LANs.

24. A non-transitory computer-readable medium including program code stored thereon, comprising:
program code for using a single radio frequency (RF) chain of a user equipment (UE) including:
program code for establishing, between the UE and a home wireless network, a data session associated with a persistent always ON application;
program code for comparing a parameter of a home signal associated with the home wireless network to a threshold;
program code for throttling the persistent always ON application upon detecting that the home signal is less than the threshold, including program code for temporarily preventing the UE from attempting to transmit data associated with the always ON application; and
program code for attempting to acquire a first alternative signal acceptable to the persistent always ON application from a first alternative wireless network, wherein the home wireless network and the first alternative wireless network communicate according to different access technologies, and wherein the throttling persists until the first alternative signal acceptable to the persistent always ON application is acquired.

25. The non-transitory computer-readable medium of claim 24, wherein the threshold is one of a received signal level, a received signal-to-noise ratio, a received interference power, a total received power, a path loss, a bit error rate, a frame error rate or a packet loss rate.

26. The non-transitory computer-readable medium of claim 24, wherein the home wireless network employs a first access technology, the alternative wireless network employs a second access technology different from the first access technology; and wherein the first access technology is one of UMTS, WCDMA, GSM, GSM/GPRS/EDGE, LTE, IS-95, CDMA2000, EVDO, UMB, or wireless LANs.

27. The non-transitory computer-readable medium of claim 24, further comprising program code for monitoring the home signal.

28. The non-transitory computer-readable medium of claim 24, further comprising:
program code for determining whether the first alternative signal is acquired successfully, comprising:
program code for continuing with the persistent always ON application from the first alternative wireless network when the first alternative signal is acquired successfully; and
program code for referring to a list of a plurality of access technologies to determine a second alternative signal to acquire when the first alternative signal is not acquired successfully.

29. A non-transitory computer-readable medium including program code stored thereon, comprising:
program code for using a single radio frequency (RF) chain of a user equipment (UE) including:
program code for establishing, between the UE and a home wireless network, a data session associated with a persistent always ON application;
program code for monitoring a home signal associated with the home wireless network;
program code for comparing a parameter of the home signal to a threshold;
program code for throttling the persistent always ON application upon detecting the home signal is less than the threshold, including program code for temporarily preventing the UE from attempting to transmit data associated with the always ON application;
program code for referring to a list of a plurality of access technologies; and
program code for acquiring an alternative signal acceptable to the persistent always ON application, wherein the alternative signal is from an alternative wireless network employing one of the plurality of access technologies, wherein the home wireless network and the alternative wireless network communicate according to different access technologies, and wherein the throttling persists until the alternative signal acceptable to the persistent always ON application is acquired.

30. The non-transitory computer-readable medium of claim 29, wherein the home wireless network employs a first access technology, the alternative wireless network employs a second access technology different from the first access technology; and wherein the first access technology is one of UMTS, WCDMA, GSM, GSM/GPRS/EDGE, LTE, IS-95, CDMA2000, EVDO, UMB, or wireless LANs, and the second access technology is one of UMTS, WCDMA, GSM, GSM/GPRS/EDGE, LTE, IS-95, CDMA2000, EVDO, UMB, or wireless LANs.

* * * * *